United States Patent [19]

Shima

[11] 4,262,357
[45] Apr. 14, 1981

[54] DATA PROCESSING SYSTEM INCORPORATING ARBITERS AND SELECTORS TO ALLOCATE TRANSMISSIONS BY MULTIPLE DEVICES ON A BUS

[75] Inventor: George T. Shima, Del Mar, Calif.

[73] Assignee: Burroughs Corporation, Detroit, Mich.

[21] Appl. No.: 56,046

[22] Filed: Jul. 9, 1979

[51] Int. Cl.³ .............................................. H04J 3/02
[52] U.S. Cl. ..................................... 370/85; 370/60; 340/147 LP; 364/200
[58] Field of Search ....................... 370/85, 60, 91, 93, 370/94, 86; 340/147 LP; 364/200

[56] References Cited

U.S. PATENT DOCUMENTS

| 3,742,148 | 6/1973 | Ledeen et al. | 370/85 |
| 3,796,992 | 3/1974 | Nakamura et al. | 370/85 |
| 3,832,689 | 8/1974 | Means et al. | 340/147 LP |
| 3,978,451 | 8/1976 | Ito et al. | 340/147 LP |
| 4,153,932 | 5/1979 | Dennis et al. | 370/94 |

Primary Examiner—Douglas W. Olms
Attorney, Agent, or Firm—Charles J. Fassbender; Kevin R. Peterson

[57] ABSTRACT

Disclosed is a data processing system which includes a plurality of devices that communicate in a time-shared fashion over a single data bus. The system also includes a network of arbiters and a network of selectors. These networks interconnect the plurality of devices, and they operate to insure that only one device transmits on the bus at a time. The networks are asynchronous and modular in design.

16 Claims, 7 Drawing Figures

DATA PROCESSING SYSTEM INCORPORATING ARBITERS AND SELECTORS TO ALLOCATE TRANSMISSIONS BY MULTIPLE DEVICES ON A BUS

BACKGROUND OF THE INVENTION

This invention relates to data processing systems, and more particularly to those systems which include a plurality of devices that communicate over a single parallel data bus in time-shared fashion. Clearly, one basic constraint which such systems must meet is to insure that only one device transmits on the bus at a time. Otherwise, if this constraint is not met, the data on the bus will be garbled.

In the prior art, a variety of circuits have been disclosed which implement the time-sharing function. But typically, those circuits operate in a synchronous fashion, whereby the decision of which device may use the bus is made by sampling "request" signals from the devices with clock pulses of a predetermined frequency. By comparison, in the disclosed data processing system, the allocation of the bus is made without the use of clock pulses in totally asynchronous manner.

Also in the prior art, the circuits which implement the time-sharing function typically are constructed as a single integrated unit which can control only a predetermined maximum number of devices. By comparison, in the disclosed data processing system, allocation of the bus is performed by circuits called arbiters and selectors which are completely modular, and which can readily be interconnected to allocate any number of devices to the bus.

Accordingly, it is a primary object of the invention to provide a novel data processing system wherein transmissions by a plurality of devices over a single data bus are controlled with modular networks of asynchronous arbiters and selectors.

BRIEF SUMMARY OF THE INVENTION

These and other objects are accomplished in accordance with the invention by a data processing system comprised of a plurality of communication devices which are connected via respective parallel input/output interfaces to a parallel data bus on which only one of the communication devices may transmit at a time. In order to allocate the use of the bus between the communication devices, each of the devices includes both a serial output channel and a corresponding serial input channel having a unique address. In operation, each communication device which seeks to use the bus, generates a bit stream on its serial output channel representative of the address of their corresponding input channel followed by a message.

The system further includes a plurality of arbiters and selectors. Each of the arbiters have two of the serial input channels for asynchronously receiving two independent bit streams, and have only one of the serial output channels for passing thereto the bit stream from their serial input channel on which bits are first received. All of the arbiters are interconnected to form an arbiter network having only one of the serial output channels and having a plurality of the serial input channels coupled respectively to the serial output channels of the communication devices.

By comparison, each of the selectors have only one of the serial input channels for receiving one bit stream, and have two of the serial output channels of which one is selectively enabled by the first bit received on the selector's input channel. Each of the selectors operate to pass all bits of the bit stream that follow the first bit to their enabled output channel. All of the selectors are interconnected to form a selector network having only one serial input channel connected to the one serial output channel of the arbiter network, and having a plurality of serial output channels connected respectively to the serial input channels of the communication devices.

The above arbiter and selector networks provide a means for only one of the messages on the output channels of the communication devices to pass at a time back to the sender's serial input channel. And each of the communication devices are operative to transmit on the bus only in response to the receipt of their own message through the arbiter and selector networks.

BRIEF DESCRIPTION OF THE DRAWINGS

Various features and advantages of the invention will best be understood by reference to the following detailed description and accompanying drawings wherein.

DETAILED DESCRIPTION

Figure 1:
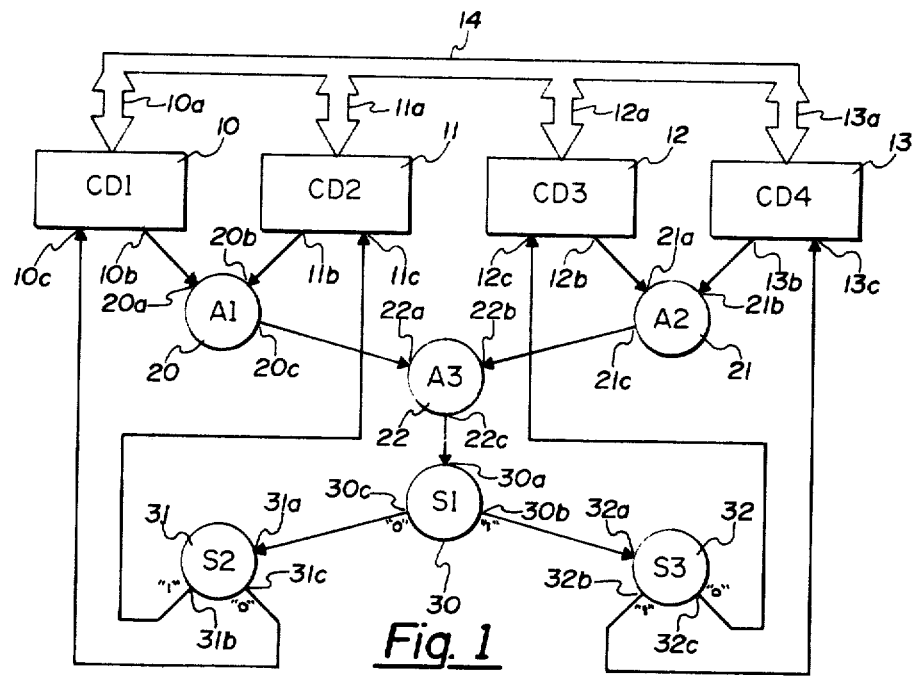
FIG. 1 is a diagram of a data processing system which is constructed according to a first embodiment of the invention.

Referring now to FIG. 1, a detailed description of one preferred embodiment of the invention will be described. This embodiment includes a total of four communication devices 10, 11, 12, and 13 which are connected via respective parallel input/output interfaces 10a, 11a, 12a, and 13a to a parallel data bus 14. As used herein, the term communication device includes all types of data processing equipment, such as a digital computer, a modem, a disk, or a printer for example. All transmissions between communication devices 10-13 occur over bus 14, on which only one communication device may transmit at a time. The function of the remaining portion of the FIG. 1 embodiment is to allocate the use of bus 14 between the communication devices.

That remaining portion includes a total of three arbiters 20, 21, and 22, and a total of three selectors 30, 31, and 32. Each arbiter has two serial input channels for asynchronously receiving bit streams from two independent sources, and has one serial output channel for passing thereto the bit stream from their serial input channel on which bits are first received. In FIG. 1, reference numerals 20a and 20b indicate the serial input channels of arbiter 20; and reference numeral 20c indicates that arbiter's output channel. Similarly, the input channels of arbiters 21 and 22 are indicated via reference numerals 21a, 21b and 22a, 22b; and their serial output channels are indicated by reference numerals 21c and 22c.

By comparison, each of the selectors have only one serial input channel for receiving bit streams from one source, and have two serial output channels of which one is selectively enabled by the first bit received on the selector's input channel. Each selector operates to pass to its output channels all bits of the bit stream that follow the first bit. In FIG. 1, reference numeral 30a indicates the input channel of selector 30; and reference numerals 30b and 30c indicate that selector's output channels. Similarly, the serial input channel of selectors 31 and 32 are respectively indicated via reference numerals 31a and 32a; and those selector's output channels are indicated via reference numerals 31b, 31c and 32b, 32c.

All of the arbiters are interconnected to form an arbiter network having only one serial output channel and having a plurality of serial input channels. In FIG. 1, the one output channel of the arbiter network is channel 22c; and the plurality of serial input channels are channels 20a, 20b, 21a, and 21b. Those input channels couple to respective serial output channels on each of the communication devices. In FIG. 1, the serial output channels of the communication devices are indicated via reference numerals 10b, 11b, 12b, and 13b.

Similarly, all of the selectors are interconnected to form a selector network having only one serial input channel, which is connected to the one serial output channel of the arbiter network, and having a plurality of output channels which coupled to respective serial input channels on the communication devices. In FIG. 1, the one serial input channel of the selector network is indicated by reference numeral 30a; and the plurality of output channels are indicated by reference numerals 31b, 31c, 32b, and 32c. Also, the respective serial input channels of the communication devices are indicated by reference numerals 10c, 11c, 12c, and 13c.

In operation, those communication devices which seek to utilize bus 14 generate a bit stream on their serial output channel which represents an address corresponding to their serial input channel followed by a message. This bit stream propagates through the arbiter network to that network's one serial output channel. From there, the selector network uses the address portion of the bit stream to enable only those output channels which are needed to route the message back to the communication device that sent it. No communication device may transmit on bus 14 until after it receives on its serial input channel the message that it sent on its serial output channel. Subsequently, after the transmissions on bus 14 are completed, the communication device sends an acknowledge signal on its serial input channel. This in turn allows another message from a different communication device to be routed back to that device through the arbiter and selector network. That device may then use bus 14.

Figure 2:
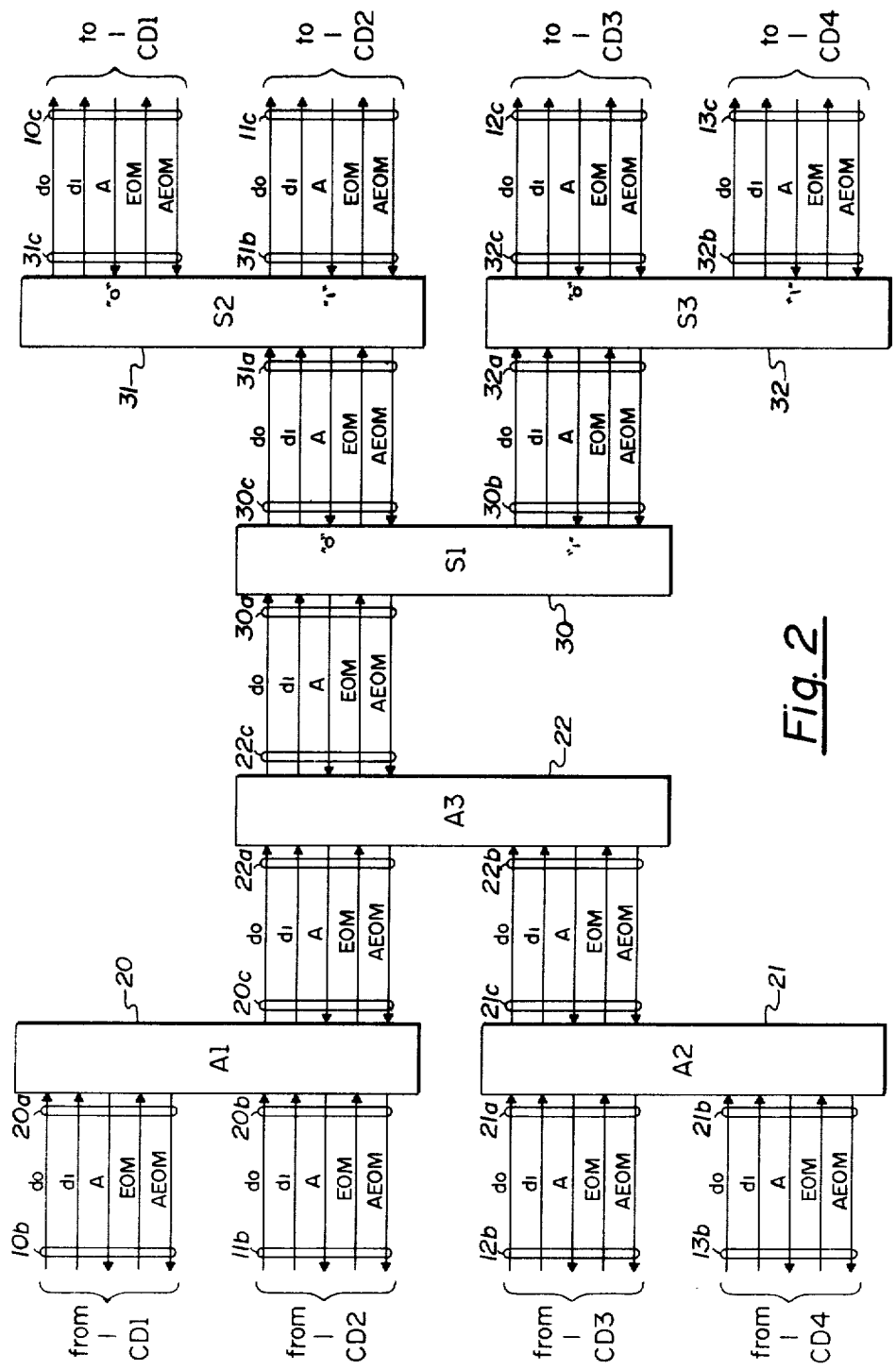
FIG. 2 illustrates in greater detail the arbiter and selector networks of FIG. 1.

All of the leads, and the signals thereon, which comprise the preferred embodiments of the serial input channels and serial output channels of FIG. 1 are illustrated in FIG. 2. Basically, each of those serial output channels include first and second leads carrying signals "d0" and "d1" for sending the address bits that are used by the selectors. Those output channels also include a third lead for receiving a signal "A" indicating the address bits have been accepted. A fourth lead is included for sending a signal "EOM" indicating the end of the bit stream. And a fifth lead is included for receiving a signal "AEOM" which indicates that the end of bit stream signal has been recognized. All of the preferred serial input channels also include first, second, third, fourth, and fifth leads for receiving those signals which are sent by the above described serial output channels, and for sending those signals which are received by the serial input channel.

A preferred implementation of arbiters having the above described serial input channel and serial output channel is disclosed in copending patent application Ser. No. 035,315, filed May 2, 1979, by Becky Jane Clark and entitled "Speed Independent Arbiter Suitable for Digital Communication Networks". Similarly, a preferred embodiment for selectors having the above described serial input channel and serial output channel is disclosed in copending patent application Ser. No. 035,411, filed May 2, 1979, by Becky Jane Clark and entitled "Speed Independent Selector Suitable for Digital Communication Networks". All of the figures and corresponding Detailed Description of the above two copending applications are herein incorporated by reference.

The details of how signals d0, d1, A, EOM, and AEOM are sequenced in the various serial input channels and serial output channels of the FIG. 2 embodiment will now be described in conjunction with FIGS. 3 and 4. Basically, FIG. 3 illustrates how those signals are sequenced when communication device 10 makes a request on its serial output channel 10b to utilize bus 14; whereas FIG. 4 illustrates how those signals are sequenced after control device 10 has completed its transmissions on bus 14.

In making a request to utilize bus 14, communication device 10 first transmits via signals d0 and d1 on its output channel 10b, the address of its input channel 10c. This address is determined by those serial output channels of the selectors which must be enabled in order for a message to pass from output channel 10b to input channel 10c. From FIG. 2 it can be seen that those output channels are channels 30c and 31c. The "C" side of a selector is enabled by sending an address bit of "0" to the selector; whereas the "B" side of the selector is enabled by sending an address bit of "1" to the selector.

Figure 3:
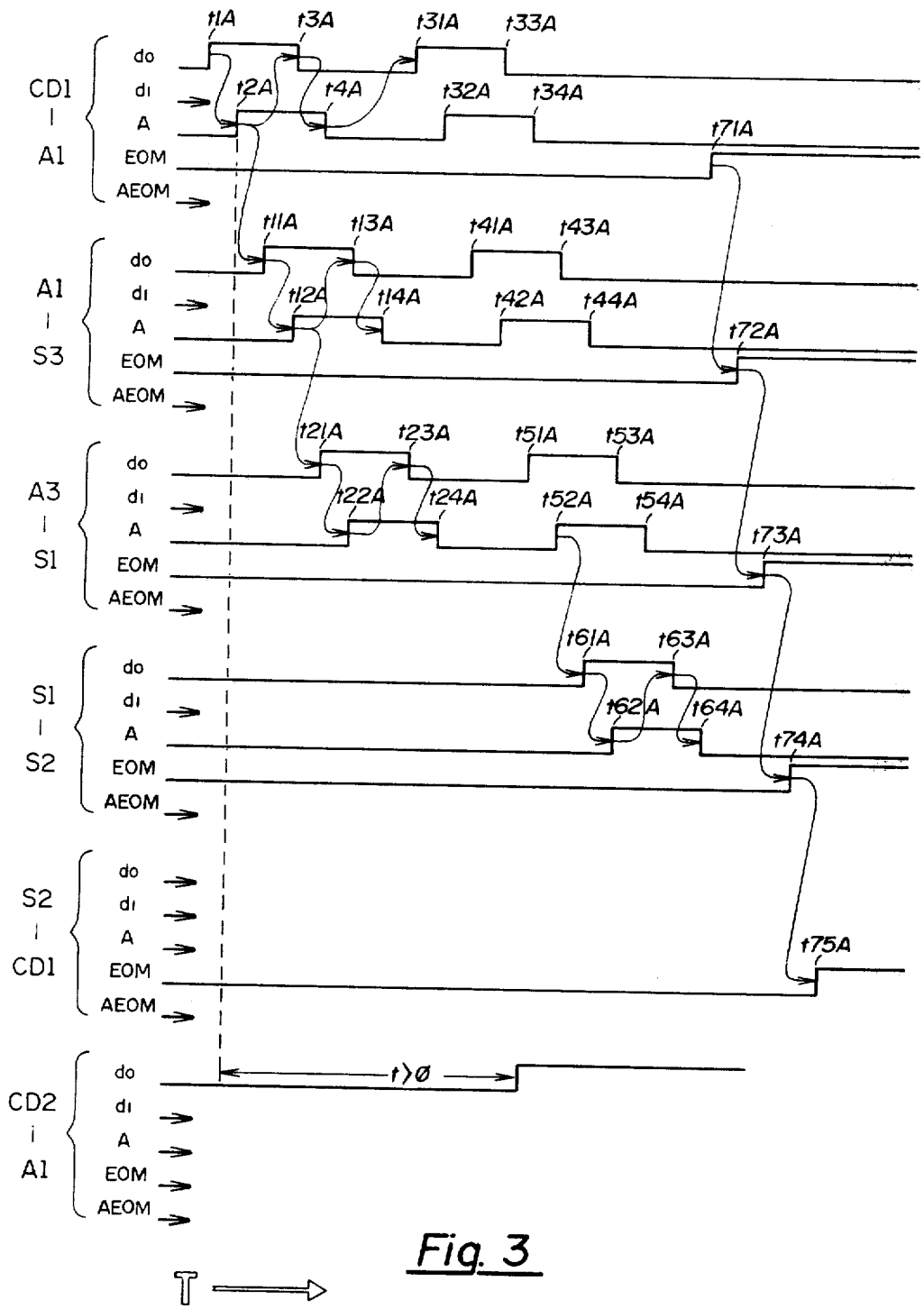
FIG. 3 is a timing diagram illustrating the sequence of signals in the networks of FIG. 2 during a selection process.
Figure 4:
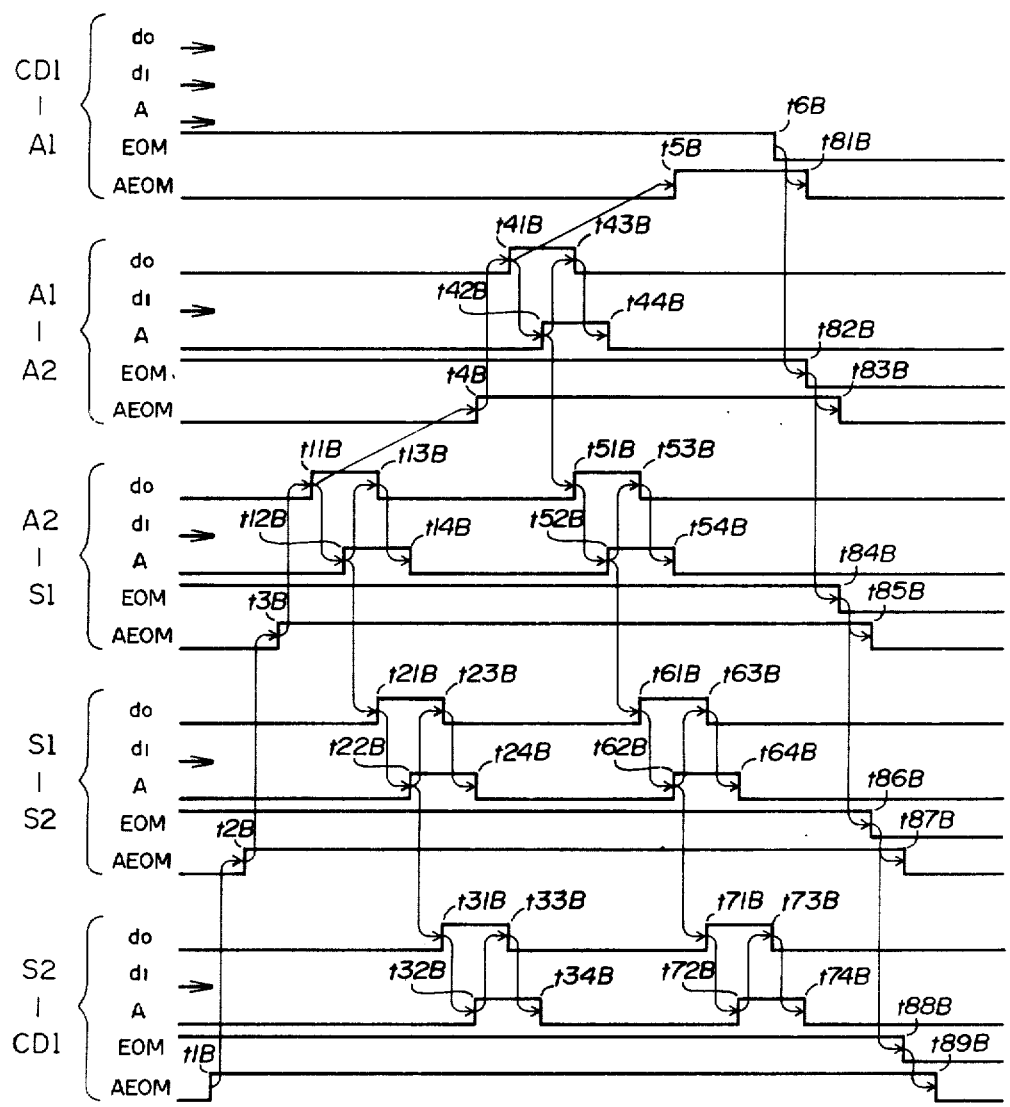
FIG. 4 is a timing diagram illustrating the sequence of signals in the networks of FIG. 2 during a deselection process.

Thus in FIG. 3, communication device 10 initiates its request to use bus 14 by making signal d0 true. This is indicated at time instant t1a. Subsequently, at time instant t2a, the receipt of signal d0 by arbiter 20 is acknowledged. This acknowledgment occurs within only a few nanoseconds provided that arbiter 21 is not already passing signals from its serial input interface 20b to its serial output interface 20c. Once arbiter 20 acknowledges the receipt of signal d0, that arbiter will not acknowledge any signals on its serial input interface 20b until after communication device 10 completes the generation of its bit stream. This is indicated by the last set of waveforms in FIG. 3.

In response to signal A on serial input channel 10a going true, communication device 10 forces signal d0 false. This is indicated at time instant t3a. Thereafter, arbiter 20 forces signal A false as indicated at time instant t4a. Communication device 10 is then free to generate the second address bit for the selectors in a similar manner. The generation of this second address bit will be described shortly.

After arbiter 20 acknowledges the receipt of signal d0 on its serial input channel 20a, it operates to pass that signal to its serial output channel 20c. This is illustrated as occurring at time instant t11a. Thereafter, arbiter 22 operates to acknowledge the receipt of signal d0 on its serial input channel 22a. This is illustrated as occurring during time instants t12a, t13a, and t14a. During these time instants, the signals on serial input channel 22a are sequenced in exactly the same manner as described above in conjunction with time instants t2a, t3a, and t4a.

After arbiter 22 acknowledges the receipt of signal d0 on its serial input channel 22a, it operates to pass that signal to its serial output channel 22c. This is illustrated as occurring at time instant t21a. In response thereto, selector 30 operates to accept signal d0 on its serial input channel 30a. The manner in which this occurs is illustrated at time instants t22a, t23a, and t24a. In addition, selector 30 operates in response to accepting signal d0 to enable its serial output channel 30c. Thereafter, all of the signals d0 and d1 which are received on that selector's serial input channel 30a are passed to serial output channel 30c.

As indicated above, communication device 10 may generate the second address bit of its bit stream after time instant t4a. This is illustrated as occurring at time instant t31a. The second address bit is then accepted by arbiter 20 as illustrated at time instants t32a–t34a. Subsequently, the second address bit is passed through arbiter 22 and selector 30 as illustrated at time instants t41a–t44a and t51–t54a. Then, the second address bit is passed to selector 31 as illustrated at time instants t61a and t64a. In response to this second address bit, selector 31 operates to enable its serial output channel 31c. This allows a message to be passed from the serial output channel 10b of communication device 10 to its serial input channel 10c.

Preferably, the message is sent by simply making signal EOM true. This is illustrated as occurring at time instant t71a. Thereafter, signal EOM is passed through arbiter 20, arbiter 22, selector 30, and selector 31 as illustrated at time instants t72a–t75a. Upon receipt of signal EOM on serial input channel 10a, communication device 10 is then free to transmit on bus 14.

After completing its transmissions on bus 14, communication device 10 operates to acknowledge the receipt of signal EOM. This is illustrated at time instant t1b in FIG. 4. In response thereto, selector 31 passes signal AEOM to its serial input channel 31a. Subsequently, selector 30 receives signal AEOM on its serial input channel 30c and passes that signal to its serial output channel 30a. This is illustrated at time instants t2b and t3b.

In response to signal AEOM going true on serial output channel 22c, arbiter 22 forces signal d0 true. This indicates that signals on serial input channel 22a had been passed through arbiter 22 to the serial output channel. If signals on serial input channel 22b had been passed through to the output channel, then arbiter 22 would operate to force signal d1 true.

Signal d0 on output channel 22 is then passed through selector 30 to output channel 30c and through selector 31 to output channel 31c. The sequence by which this occurs is identical to that previously described for passing signal d0 through selectors 30 and 31 in conjunction with FIG. 3. This sequence is illustrated in FIG. 4 as occurring at time instants t11b–t14b, t21b–t24b, and t31b–t34b.

Also in response to making signal d0 true on serial output channel 22c, arbiter 22 operates to force signal AEOM true on its serial input channel 22a. This is illustrated as occurring at time instant t4b. In response thereto, arbiter 20 forces signal d0 true on its serial output channel 20c. This indicates that arbiter 20 was previously passing signals from its serial input channel 20a to its serial output channel. Signal d0 on serial output channel 20c is then propagated through arbiter 22, selector 30, and selector 31 as indicated at time instants t41b–t44b, t51b–t54b, t61b–t64b, and t71b–t74b.

In response to signal d0 going true on serial output channel 20c, arbiter 20 forces signal AEOM true on serial input channel 20a. Thereafter, communication device 10 forces signal EOM false. These transitions are illustrated at time instants t5b and t6b. Subsequently, in response to the false state of signal EOM, arbiter 20 operates to force signal AEOM false on its serial input channel 20a, and to force signal EOM false on its serial output channel 20c. This is illustrated as occurring at time instants t81b and t82b. Similar signal transitions then sequentially occur in arbiter 22, selector 30, and selector 31 to complete the deselecting sequence as illustrated at time instants t83b–t89b.

In the above described deselection sequence, signals d0 and d1 are provided for use by that communication device which was transmitting on bus 14 as a check against faulty operations in the arbiter and selector networks. For example, if communication device 10 receives something other than a sequence of two true d0 signals on its serial input channel 10c, then a hardware fault is present. However, if this check is not desired, the deselection sequence of FIG. 4 may be speeded up by simultaneously forcing signal AEOM true on serial output channel 10b, and forcing signal EOM false on serial input channel 10c. In that case, signals d0 and d1 both remain false and only those transitions occur which are indicated at time instants t81b–t89b.

Figure 5:
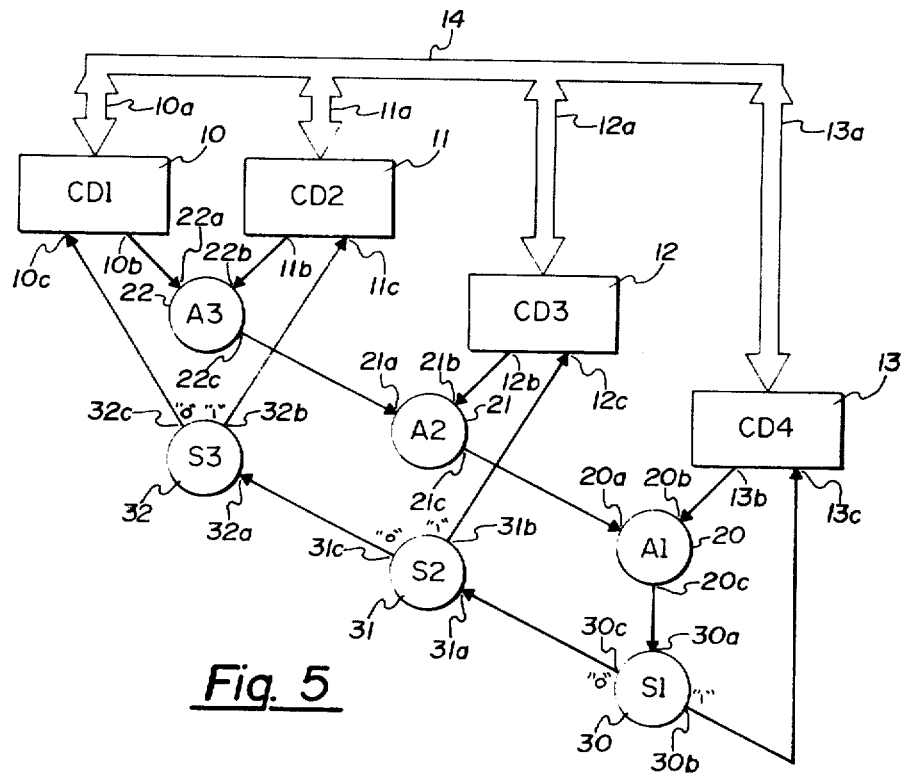
FIG. 5 is a diagram of a data processing system which is constructed according to a second embodiment of the invention.

Referring now to FIG. 5, a second embodiment of the invention will be described. This embodiment is similar to the embodiment of FIG. 1 in that it contains the same components. Like components are identified by like reference numerals. However, a distinguishing feature of the FIG. 5 embodiment is the manner in which the arbiters and selectors are interconnected.

In particular, in FIG. 5, arbiters 20, 21, and 22 are interconnected such that the bit streams from serial output channels 10b, 11b, 12b, and 13b of the communication devices do not pass through the same number of arbiters before reaching the single serial output channel 20c of the arbiter network. For example, bit streams from serial output channel 13b pass through only one arbiter (arbiter 20) before reaching serial output channel 20c; whereas bit streams from serial output channel 10b pass through three arbiters (arbiters 20, 21, and 22) before reaching serial output channel 20c.

By comparison, in the FIG. 1 embodiment, arbiters 20, 21, and 22 are interconnected such that the bit stream from serial output channels 10b, 11b, 12b, and 13b of the communication devices pass through the same number of arbiters before reaching the single serial output channel 22c of the arbiter network. The significance of this distinguishing feature is that in the FIG. 1 embodiment, each of the communication devices have equal access to the use of bus 14; whereas in the FIG. 5 embodiment, some of the communication devices have greater access to the use of bus 14 when others. In particular, in the FIG. 5 embodiment, communication device 13 may access bus 14 50% of the time; communication device 12 may access the bus 25% of the time; and communication devices 10 and 11 may each access the bus 12½% of the time. By comparison, in the FIG. 1 embodiment, each of the communication devices 10, 11, 12, and 13 may access the bus 25% of the time.

These access times may be verified simply by reconsidering the operation of the arbiters as previously described in conjunction with FIG. 3. There it was stated that the arbiter operates to pass only the bit stream on its serial input channel on which bits are first received, and will not acknowledge the receipt of bits on its other input channel until the first bit stream has completely passed through the arbiter. This is illustrated by the last set of waveforms in FIG. 3 following time instant t2a. Subsequently, after the first bit stream has passed through the arbiter, it then operates to acknowledge the d0 and d1 signals on its other input channel. In other words, whenever two communication devices both attempt to pass a series of bit streams through one arbiter at the same time, the arbiter operates to alternately pass one bit stream from one of the communication devices and then pass one bit stream from the other communication device.

It should also be pointed out that the addresses of the serial input channels of the communication devices in the FIG. 5 embodiment are different from the corresponding addresses in the FIG. 1 embodiment. This is because the address of a communication device's serial input channel is dictated by the arrangement of the selectors as was previously described. Thus for example, in the FIG. 5 embodiment, communication device 13 will address its serial input channel 13c by merely sending a single address bit of "1" to arbiter 20. By comparison, communication device 11 will address its serial input channel 11c by sending a three bit sequence of "0,0,1" to arbiter 22.

Figure 6:
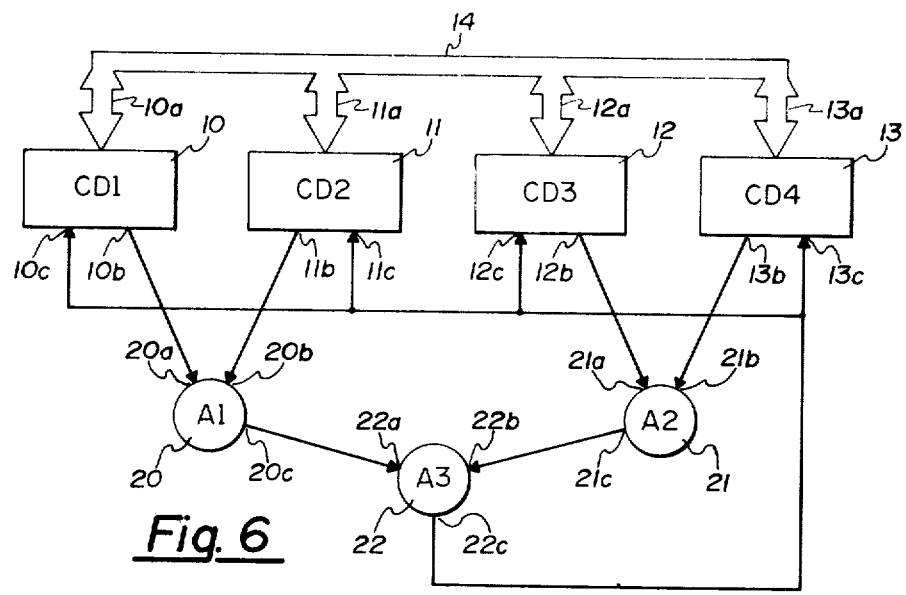
FIG. 6 is a diagram of a data processing system which is constructed according to a third embodiment of the invention.

Referring now to FIG. 6, a third embodiment of the invention will be described. This embodiment is also similar to the first embodiment of FIG. 1; and again like components are identified by like reference numerals. A distinguishing feature of the third embodiment is that it includes no selectors and the single serial output channel of the arbiter network is connected to the serial input channel of all of the communication devices. In operation, all of the communication devices 10-13 monitor all of the address bits which are generated on serial output channel 22c of arbiter 22. The signal sequencing is the same as illustrated by the first two sets of waveforms as illustrated in FIG. 3. Each of the communication devices then examine the address bits they receive; but only the one communication device which is addressed transmits on bus 14.

Figure 7:
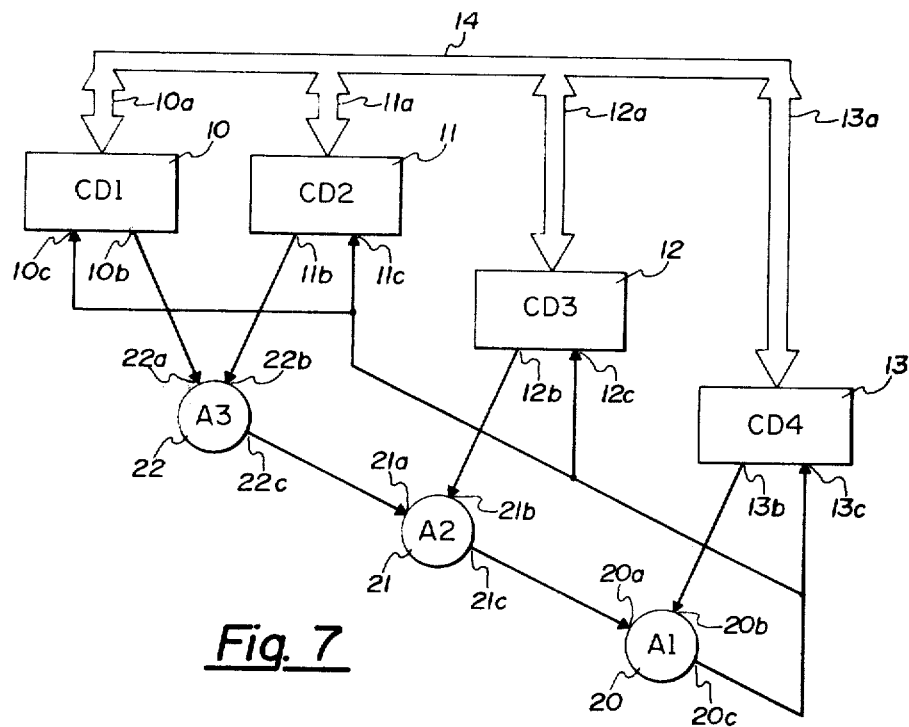
FIG. 7 is a diagram of a data processing system which is constructed according to a fourth embodiment of the invention.

Referring next to FIG. 7, a fourth embodiment of the invention will be described. This embodiment is similar to the second embodiment of FIG. 5; and like components are again identified by like reference numerals. A distinguishing feature of the fourth embodiment is that it contains no selectors, and single output channel 20c of the arbiter network connects to the serial input channel of all of the communication devices. In operation, all of the communication devices 10-13 monitor the address bits which are generated on serial output channel 20c; but only the one communication device whose address was sent transmits on bus 14. Again, this signal sequence is illustrated by the first two sets of waveforms in FIG. 3.

Note that in the fourth embodiment, as well as in the third embodiment, the address of the serial input channel for the communication devices are arbitrarily assigned. This is in comparison to the address for the input channels in the first and second embodiments which were dictated by the interconnection of the selectors in the selector network. Further, it should be pointed out that the distinguishing feature between the third and fourth embodiments of the invention is that in the third embodiment, each of the communication devices have equal access to bus 14; whereas in the fourth embodiment, some of the communication devices have greater access to bus 14 than others. The reason for this is due to the arrangement of the arbiters as was previously described in conjunction with FIG. 5.

Various preferred embodiments of the invention have now been described in detail. In addition, many changes and modifications can be made to those details without departing from the nature and spirit of the invention. For example, while FIGS. 1, 5, 6, and 7 each illustrate an embodiment of the invention containing only four communication devices, it is to be understood that those embodiments may readily be modified by adding or subtracting arbiters and selectors to accommodate either more or less communication devices. Thus, since many modifications to the illustrated embodiments are possible, the scope of the invention is not to be limited to those details but is to be defined by the appended claims.

What is claimed is:

1. A data processing system comprised of:

a plurality of communication devices which are connected via respective parallel input/output interfaces to a parallel data bus on which only one of said communication devices may transmit at a time;

wherein in order to allocate the use of said bus between said communication devices, each of said devices include both a serial output channel and a corresponding serial input channel having a unique address and wherein said system further includes a plurality of arbiters and selectors;

said serial output channel on each communication device which seeks the use of said bus being operative to generate a bit stream representing the address of their corresponding input channel followed by a message;

each of said arbiters having two serial input channels for asynchronously receiving respective bit streams, and having only one serial output channel for passing thereto the bit stream from their serial input channel on which bits are first received;

said arbiters being interconnected to form an arbiter network having only one serial output channel and having a plurality of serial input channels coupled respectively to the serial output channels of said communication devices;

each of said selectors having only one serial input channel for receiving one bit stream, and having two serial output channels of which one is selectively enabled by the first bit received on the selector's input channel, each of said selectors operating to pass any bits of said bit stream that follow said first bit to said enabled output channel;

said selectors being interconnected to form a selector network having only one serial input channel connected to said one serial output channel of said arbiter network, and having a plurality of output channels coupled respectively to the serial input channels of said communication devices; and said communication devices being operative to transmit on said bus only in response to the passage of their own message through said arbiter and selector networks to their own serial input channel.

2. A data processing system according to claim 1 wherein said arbiters of said arbiter network are interconnected such that said bit stream from said serial output channel of each of said communication devices pass through the same number of arbiters before reaching said one serial output channel of said arbiter network.

3. A data processing system according to claim 1 wherein said arbiters of said arbiter network are interconnected such that said bit stream from said serial output channel of each of said communication devices do not pass through the same number of arbiters before reaching said one serial output channel of said arbiter network.

4. A data processing system according to claim 1 wherein each of said serial output channels include first and second leads for sending said address bits, a third lead for receiving a signal indicating said address bits have been accepted, a fourth lead for sending a signal indicating the end of said bit stream, and a fifth lead for receiving a signal indicating said end of bit stream signal has been recognized; and wherein said serial input channels include first, second, third, fourth, and fifth leads for receiving those signals which are sent by said serial output channels and for sending those signals which are received by said serial input channels.

5. A data processing system according to claim 4 wherein each of said arbiters include an address sending means responsive to said signal on the fifth lead of said serial output channel for sending one bit on the first and second leads thereof indicating the one serial input channel of the arbiter whose bit stream was last passed to the serial output channel.

6. A data processing system comprised of:
a plurality of communication devices which are connected via respective parallel input/output interfaces to a parallel data bus on which only one of said communication devices may transmit at a time;
wherein in order to allocate the use of said bus between said communication devices each of said devices include both a serial output channel and a corresponding serial input channel having an unique address and wherein said system further includes a plurality of arbiters;
said serial output channel on each communication device which seeks the use of said bus being operative to generate a bit stream representing the address of their corresponding input channel;
each of said arbiters having two serial input channels for asynchronously receiving respective bit streams, and having only one serial output channel for passing thereto the bit stream from their serial input channel on which bits are first received;
said arbiters being interconnected to form an arbiter network having only one serial output channel which is coupled to said serial input channel on all of said communication devices, and having a plurality of serial input channels coupled respectively to the serial output channels of said communication devices; and
said communication devices being operative to transmit on said bus only in response to the passage of a bit stream representative of their own address through said arbiter network to their serial input channel.

7. A data processing system according to claim 6 wherein said arbiters of said arbiter network are interconnected such that said bit stream from said serial output channel of each of said communication devices pass through the same number of arbiters before reaching said one serial output channel of said arbiter network.

8. A data processing system according to claim 6 wherein said arbiters of said arbiter network are interconnected such that said bit stream from said serial output channel of each of said communication devices do not pass through the same number of arbiters before reaching said one serial output channel of said arbiter network.

9. A data processing system according to claim 6 wherein each of said serial output channels include first and second leads for sending said address bits, a third lead for receiving a signal indicating said address bits have been accepted, a fourth lead for sending a signal indicating the end of said bit stream, and a fifth lead for receiving a signal indicating said end of bit stream signal has been recognized; and wherein said serial input channels include first, second, third, fourth, and fifth leads for receiving those signals which are sent by said serial output channels and for sending those signals which are received by said serial input channels.

10. A data processing system according to claim 9 wherein each of said arbiters include an address sending means responsive to said signal on the fifth lead of said serial output channel for sending one bit on the first and second leads thereof indicating the one serial input channel of the arbiter whose bit stream was last passed to the serial output channel.

11. A data processing system comprised of:
a plurality of communication devices coupled to transmit via a parallel data bus on which only one of said devices can transmit at a time;
each of said communication devices including output channel means for generating a unique bit stream thereon indicating a request to use said bus;
first network means for asynchronously receiving said bit streams from the output channels of all of said communication devices and for passing those bit streams one at a time to a single output channel in a sequence representative of the sequence in which they are received; and
second network means for passing portions of each bit stream in said sequence from said first network back to only the same communication device that sent it;
each of said communication devices being operative to transmit on said bus only while receiving the passed portion of their own bit stream through said first and second network.

12. A data processing system according to claim 11 wherein each of said output channel means generate said unique bit stream in the form of a unique address followed by a common message, and wherein said second network means passes only said common message back to the same communication device that sent it.

13. A data processing system according to claim 11 wherein said first network means consists of a network of arbiters each having two of said serial input channels for asynchronously receiving respective bit streams and having only one of said serial output channels for passing thereto the bit stream from their serial input channel on which bits are first received, and wherein said second network means consists of a plurality of selectors each having one of said serial input channels and two of said serial output channels of which one is selectively enabled by the first bit received on the selector's input channel to pass any bits of said bit stream that follow said first bit.

14. A data processing system comprised of:
a plurality of communication devices coupled to transmit via a parallel data bus on which only one of said devices can transmit at a time;
each of said communication devices including an output channel means for generating a unique bit stream thereon indicating a request to use said bus; and
network means for asynchronously receiving said bit streams from the output channel of all of said communication devices and for passing those bit streams one at a time to a single output channel in a sequence representative of the sequence in which they are received;
each of said communication devices further including an input channel means for receiving all of said bit streams from said single output channel of said network, and being operative to transmit on said bus only while receiving their own bit stream through said network.

15. A data processing system according to claim 14 wherein each of said output channel means generates said unique bit stream in the form of a unique address followed by a common message.

16. A data processing system according to claim 14 wherein said network means consists of a network of arbiters each having two of said serial input channels for asynchronously receiving respective bit streams and having only one of said serial output channels for passing thereto the bit stream from their serial input channel on which bits are first received.

* * * * *